E. H. VINCENT.
LOCKING AND TILTING STEERING WHEEL.
APPLICATION FILED NOV. 28, 1919.

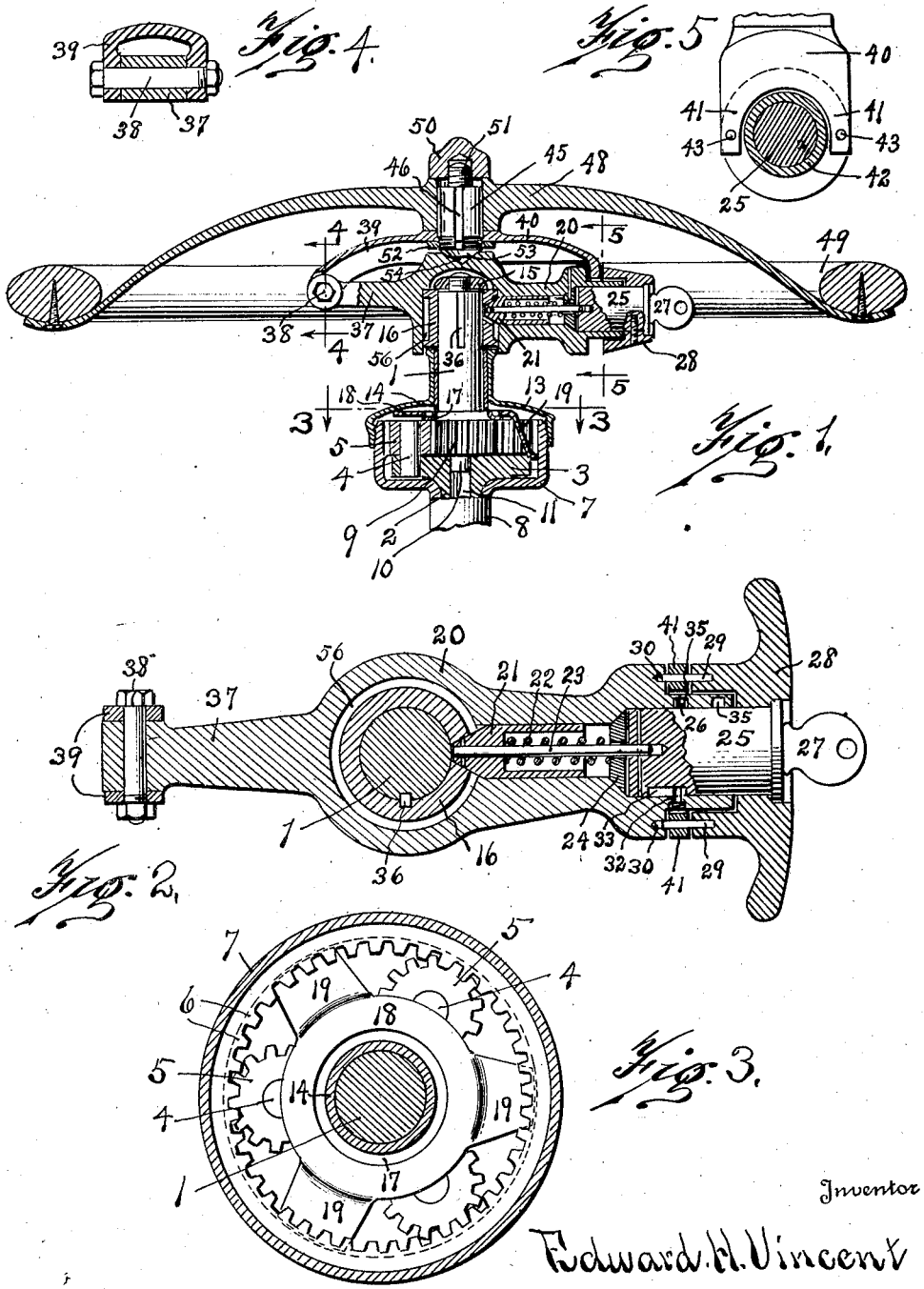

1,438,004.

Patented Dec. 5, 1922.
3 SHEETS—SHEET 2.

Inventor
Edward H. Vincent
By Edward N. Pagelsen
Attorney

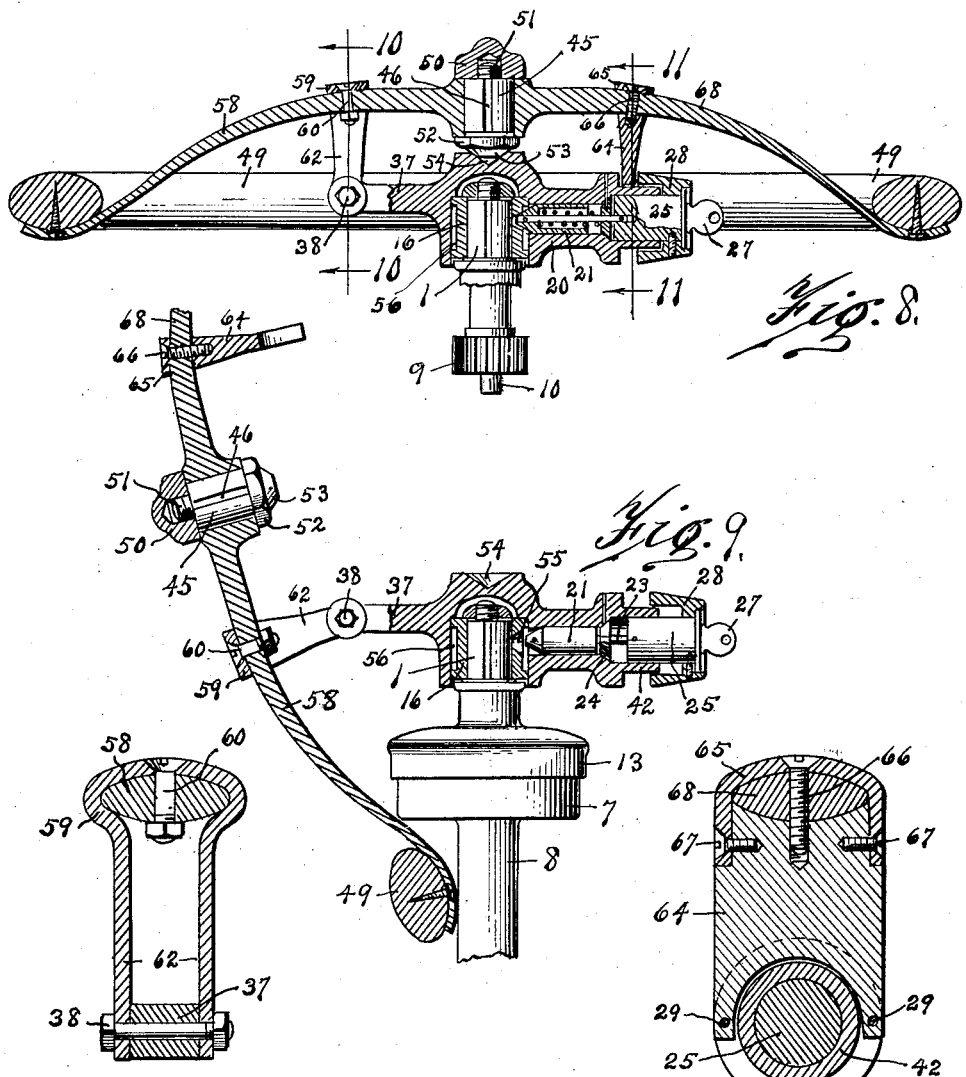

Patented Dec. 5, 1922.

1,438,004

UNITED STATES PATENT OFFICE.

EDWARD H. VINCENT, OF DETROIT, MICHIGAN.

LOCKING AND TILTING STEERING WHEEL.

Application filed November 28, 1919. Serial No. 341,169.

*To all whom it may concern:*

Be it known that I, EDWARD H. VINCENT, a citizen of the United States, and residing at Detroit, in the county of Wayne and State of Michigan, have invented a new and Improved Locking and Tilting Steering Wheel, of which the following is a specification.

This invention relates to the steering wheels of motor vehicles, particularly to that class which may be locked to and unlocked from the steering rod, and its object is to provide a wheel mounting which may be attached to the upper end of the steering rod in the place where the steering wheel was formerly mounted and by means of which the ordinary steering wheel may be connected to or disconnected from the steering rod at will. Another object of this invention is to so construct the wheel mounting that the wheel may be tilted about an axis which is generally at an angle to the steering rod so as to afford greater space for the driver to enter and leave his seat. A further object of this invention is to provide a lock in the wheel mounting to control the connection between the steering wheel and steering rod and between the wheel and its mounting so that the wheel may be locked to the steering rod and furthermore, locked thereto at the correct angle.

Figure 6:
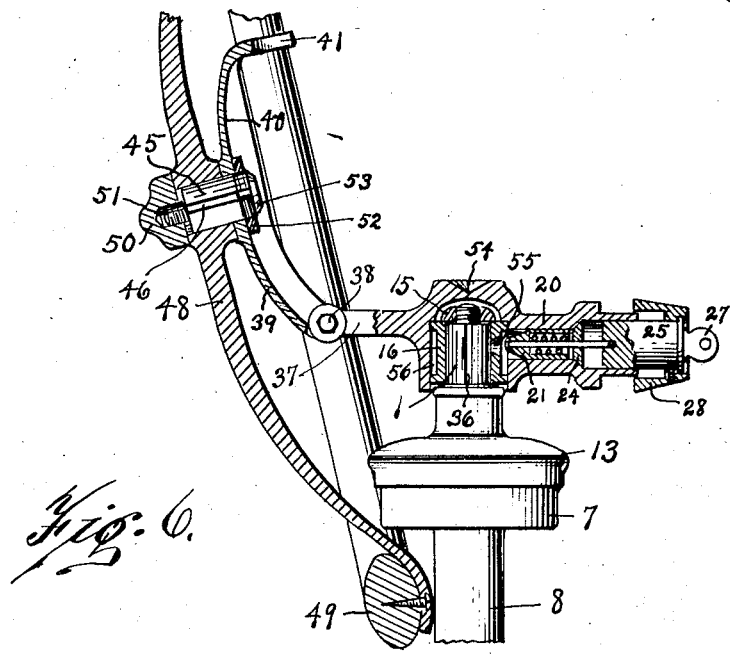
Figure 7:
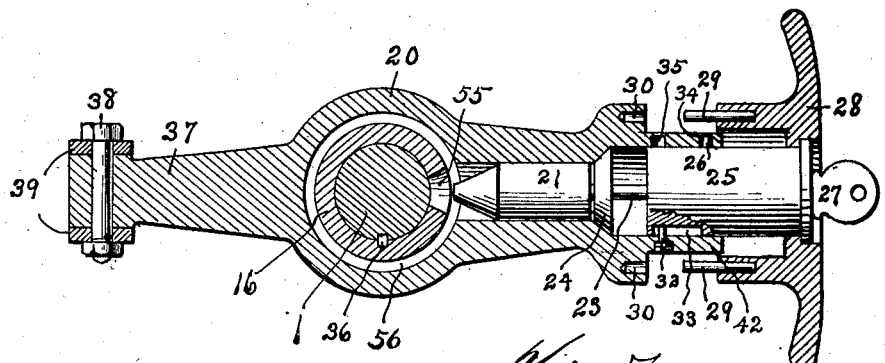

In the accompanying drawings, Fig. 1 is a central lengitudinal section of a steering wheel, a steering head, and the reduction gear at the upper end of the steering column. Fig. 2 is a section through the lock which connects the steering head to the steering rod on a plane at right angles to the steering rod. Figs. 3, 4 and 5 are sections on the lines 3—3, 4—4 and 5—5 of Fig. 1 respectively. Fig. 6 is a section similar to Fig. 1 with the wheel tilted up. Fig. 7 is a section similar to Fig. 2 with the locking bolt withdrawn. Fig. 8 is a central longitudinal section of a modified construction of steering wheel. Fig. 9 is a similar section with the steering wheel tilted up. Figs. 10 and 11 are sections on the lines 10—10 and 11—11 of Fig. 8 respectively.

Similar reference characters refer to like parts throughout the several views.

The steering wheel shown in the drawings in Figs. 1 to 7 inclusive is one ordinarily secured to the upper end of the steering rod but is now shown connected to a mounting which is itself secured to the upper end of the steering rod so that the whole structure constitutes a tiltable wheel which can be locked and unlocked from the steering rod at will. In Figs. 1 and 3 the steering rod is shown in two parts 1 and 2, the upper end of the part 2 being in the form of a disk 3 which carries pins 4 on which are mounted small idler pinions 5 which mesh with internal teeth 6 on the inside of a gear case 7 which is connected to the upper end of the steering column 8.

On the lower end of the part 1 is a spur gear 9 which meshes with the idlers 5 and an extension 10 of this upper part of the steering rod extends into the bore 11 of the lower part. By this gear mechanism the upper end 1 of the steering rod is permitted to turn through a greater angular distance than the lower part and thereby increase the torque thereon. A cover 13 screws onto this gear case 7 and within it is a bushing 14 in which the upper part 1 of the steering rod is journaled.

At the upper end of this steering rod is a nut 15 which holds a bushing 16 in position against this bushing 14. This bushing 14 rests against a small washer 17 which in turn rests on the ends of the teeth of the gear 9. Just above this washer 17 is the central portion of a washer 18 whose three arms 19 extend under the teeth 6 of the internal gear ring. When the parts are to be assembled the stem 1 and its gear 9 are positioned as shown in Fig. 1 on the lower part 2, and the washer 17 slipped down into position, after which the three-armed washer 18 is inserted, the arms 19 being sprung in so that they may slide down over the faces of the teeth 6, beneath which the ends extend. After they have been forced down and after the bushing 14 has been placed upon the stem 1, the cover 13 may be screwed down, after which the bushing 16 is put into place and the nut 15 screwed down onto it. When the parts are thus assembled, they cannot be removed except upon removal of the nut 15 which will be prevented by a lock which will now be described.

Mounted on the bushing 16 so as to be normally freely rotatable thereon is a steering head 20 which has a central bore to receive the hollow locking bolt 21 within which is a spring 22 tending to force it toward the steering rod 1. The stem 23 connects to this locking bolt 21 and extends outwardly through the washer 24 which serves as an abutment for this spring 22. The bore of the head is preferably enlarged outside of the washer to receive the lock body 25 which is cylindrical and which has a laterally extending locking pin 26 which may be caused to move in and out radially of this cylindrical lock body by means of a key 27. The lock body is secured in a button 28 which is provided with inwardly extending pins 29 adapted to enter the holes 30 in one end of the steering head 20. This steering head carries a guide pin 32 adapted to enter the guide groove 33 in the lock body.

When the key 27 is inserted and turned to withdraw the pin 26 from either of the holes 35, then the button 28 can be pulled out or pushed inwardly to unlock or lock the steering head and the bushing 16. This bushing is prevented from turning on the steering rod 1 by means of a key 36.

The arm 37 of this steering head carries a pin 38 on which is mounted the arm 39 of an arched wheel carrier whose opposite arm 40 is provided with a pair of ears 41 (Fig. 5) adapted to fit around a reduced portion 42 of the steering head. These ears 41 are provided with holes 43 through which the pins 29 carried by the button 28 may be extended. When the button is moved out this wheel carrier may be swung up or back, but after the wheel carrier has been moved down to the position shown in Fig. 1 and the button 28 is moved inwardly so that the pins 29 pass through the holes 43, and the key 27 is turned to proper position, then the wheel carrier will be locked in the position shown in Fig. 1.

This wheel carrier is provided with a central bore in which is mounted a short shaft 45 which carries a key 46 and on which is mounted the spider 48 of the steering wheel having a rim 49. A nut 50 is screwed down onto the reduced end 51 of this short shaft and a nut 52 on the opposite end of this shaft is adapted to adjust it relative to the wheel carrier. This shaft 45 is of the same diameter as the upper end 1 of the steering rod and the wheel 48—49 which was removed from the steering rod will fit onto this short shaft 45. All that is necessary to change an ordinary steering wheel to a locking and tilting steering wheel is to remove it, secure the bushing 16 and the steering head in position, mount the wheel carrier and shaft 45 on the steering head and secure the old wheel to the short shaft 45. The inner end 53 of this shaft is adapted to enter a depression 54 in the upper part of the hub of the head 20, and the end 53 and the depression 54 are preferably made conical as shown in Figs. 1 and 6. By turning the nuts 50 and 52, this shaft 45 may be moved longitudinally and thereby the holes 43 may be accurately alined with the pins 29.

As indicated in Figs. 6 and 7, the bushing 16 has a circumferential groove 56 and a recess 55 in which the tapering end of the bolt 21 engages when in locking position. When the bolt is withdrawn, its inner end still extends into the groove 56 which prevents the steering head and wheel being lifted off the bushing 16 by anyone not holding a key 27, as the pin 26 of the lock extends into the recess 35 and prevents the button 28 being pulled out farther. After turning the key 27, however, the locking bolt can be withdrawn entirely from the groove 56, after which the head may be lifted from the bushing 16 and the nut 15 unscrewed to release the bushing.

In the modification shown in Figs. 8 to 11 inclusive, the wheel carrier shown in Figs. 1 to 7 inclusive is omitted and two stirrups substituted therefor. The construction and operation of the steering head and the construction of the steering wheel proper is the same as that shown in Figs. 1 to 7 inclusive and the description thereof need not be repeated.

Secured to one arm 58 of the spider of the steering wheel is a stirrup 59, normally held in place by means of the bolt 60. The lower ends of the sides 62 of this stirrup fit the sides of the outer end of the arm 37 of the steering head and the same bolt 38 may be used to pivot this stirrup on this arm as to pivot the part 39 of the wheel carrier.

The stirrup which is adapted to be engaged by the pins 29 on the button 28 consists of a body portion 64 which has a semicircular recess to receive the extension 42 of the steering head and is provided with holes to receive the pins 29 carried by the button 28 as heretofore described. A strap 65 is secured to the body 64 by means of screws 67 and a third screw 66 extends through the arm 68 of the spider of this steering wheel and of the body 64 of the stirrup to hold the parts rigidly together. The operation of the several parts is substantially identical with those shown in Figs. 1 to 7 inclusive.

The details and proportions of the various parts of this structure may all be changed by those skilled in the art without departing from the spirit of my invention as set forth in the following claims.

I claim:—

1. In combination, a steering rod, a steering wheel, a stering head rotatably mounted on the upper end of the steering rod, a locking bolt adapted to secure the steering head to the steering rod, a key operated lock to secure the bolt in its operative and inoperative positions, a wheel carrier pivotally mounted on said head, and a short shaft similar to the upper end of the steering rod connected to said wheel carrier on which shaft the steering wheel is mounted, said head having a central depression and said shaft having its lower end formed to extend into said depression.

2. In combination, a steering rod, a steering wheel which was fitted onto the upper end of the rod, a bushing secured to said upper end of the steering rod in the position previously occupied by said wheel, a steering head rotatably mounted on said bushing, a locking bolt adapted to secure the steering head to the bushing, a wheel carrier mounted on said head, and a short shaft similar to the upper end of the steering rod on which the steering wheel is secured, said bushing having a circumferential groove to receive the inner end of the locking bolt to prevent the head being lifted off the bushing.

3. In combination, a steering rod, a steering wheel, a steering head rotatably mounted on the upper end of the steering rod, a locking bolt adapted to secure the steering head to the steering rod, a key operated lock comprising a cylindrical body connected to said bolt, a button connected to said lock and adapted to move it and the locking bolt outwardly, a wheel carrier pivotally mounted on said head, and a short shaft similar to the upper end of the steering rod mounted on said carrier in alinement with said steering rod on which shaft a steering wheel is secured.

4. In combination, a steering rod, a steering wheel, a steering head rotatably mounted on the upper end of the steering rod, a wheel carrier pivotally mounted on said head, said wheel carrier provided with a saddle adapted to rest on the steering head, said steering head being formed with a cylindrical extension which the saddle is adapted to fit a locking bolt, said saddle having holes parallel to said locking bolt, a key operated lock comprising a cylindrical body connected to the outer end of said bolt, a button connected to said lock and adapted to move it and the locking bolt outwardly, pins mounted in said button and adapted to enter the holes in the saddle on said wheel carrier to lock the same in operative position, and a short shaft similar to the upper end of the steering rod mounted on said wheel carrier in alinement with said steering rod on which shaft the steering wheel is secured.

5. In combination, a steering rod, a steering wheel, a steering head mounted on the upper end of the steering rod, an arched wheel carrier pivoted at one end to the steering head and engaging the head with its other end, means to secure the second end to the head, a short shaft carried by the wheel carrier centrally of the steering rod and whereon said wheel is mounted, and means to adjust said shaft longitudinally in the wheel carrier.

6. In combination, a steering rod, a steering head mounted on the upper end of the steering rod, a wheel carrier comprising a member pivoted to said steering head at one side of the steering rod and a second member engaging the head on the opposite side of the steering rod, a steering wheel mounted on the carrier, means to attach said second member to the head, and a lock to control the operation of said means and to secure the head to the rod.

7. In combination, a steering rod, a steering wheel, a steering head mounted on the upper end of the steering rod, an arched wheel carrier pivoted at one end to the steering head and engaging the head with its other end, means to secure the second end to the head, a short shaft carried by the wheel carrier centrally of the steering rod and whereon said wheel is mounted, and means to adjust said shaft longitudinally in the wheel carrier, the lower end of said short shaft being conical and the upper part of the steering head being formed with a conical socket to receive the end of the shaft.

8. In combination, a steering rod, a steering wheel, a steering head rotatably mounted on the upper end of the steering rod, a locking bolt adapted to secure the steering head to the steering rod, a key operated lock comprising a cylindrical body connected to said bolt, a button connected to said lock and adapted to move it and the locking bolt outwardly, a wheel carrier pivotally mounted on said head, a short shaft similar to the upper end of the steering rod mounted on said carrier in alinement with said steering rod on which shaft a steering wheel is secured, said wheel carrier having a forked arm which fits over the head adjacent said locking button and having a hole in its end, and a pin carried by said button and slidable in said hole to lock the wheel carrier from tilting.

9. In combination, a steering rod, a bushing mounted thereon and having a circumferential groove and a socket, a nut on the end of the rod to secure the bushing in position, a steering head provided with a cylindrical socket to receive the bushing and nut, a locking bolt slidable in said head radially of the steering rod, a lock to secure the bolt in its inner position with its inner end in the socket in the bushing or in its outer position with its inner end in said groove, a steering wheel, means whereby the wheel is pivoted with its hub above the head, and means for securing said wheel in such position.

10. In combination, a steering rod, a steering wheel, a steering head rotatably mounted on the steering rod, means pivotally connected to said head on which the steering wheel is mounted, a short shaft secured centrally of the steering wheel and adapted to engage the head with its lower end, and means to adjust the short shaft relative to said wheel.

11. In combination, a steering rod, a steering head mounted on the steering rod, a locking bolt slidable inwardly to secure the head to the rod, a steering wheel, an arm extending down from the steering wheel and a pivot connecting the end of said arm to the steering head, a second arm extending down from the steering wheel and engaging said head a distance from the pivot, and means for simultaneously locking said second arm to the head and moving said locking bolt to operative position.

12. In combination with a steering rod, a cylindrical grooved bushing rigidly secured thereto, a hollow steering head rotatably mounted on and entirely encompassing said bushing, and means extending into the groove in the bushing for securing a steering wheel to said head.

13. In combination, a steering rod, a steering wheel, a steering head mounted on the upper end of the steering rod, a wheel carrier mounted on said steering head, a short shaft connected to said wheel carrier on which the steering wheel is mounted, said steering head having a depression and said shaft having its lower end formed to extend into said depression.

14. In combination, a steering rod, a bushing secured thereto and provided with a notch and a circumferential groove, a steering head mounted on the bushing, and a locking bolt carried by the head and adapted to enter the notch to lock the steering head to the bushing, said bolt also being adapted to be moved out of the notch but extend into the groove to prevent endwise removal of the head from the bushing, and to be moved out of the groove to permit removal of the head from the bushing.

15. In combination with a steering rod, a cylindrical bushing being circumferentially grooved, and rigidly secured thereto, a hollow steering head rotatably mounted on the bushing, and means extending into the groove in the bushing for securing a steering wheel to said head.

16. In combination with a steering rod, a cylindrical bushing rigidly secured thereto and having a cylindrical groove, a steering head having a cylindrical bore and rotatably mounted on said bushing, lock means carried by the head for locking the head to the bushing, and extending into said groove to prevent removal of the head from the bushing a wheel carrier mounted on said head, and means upon said carrier for securing a steering wheel.

17. In combination with a steering rod, a cylindrical bushing rigidly secured thereto and having a cylindrical groove, a steering head having a cylindrical hub portion and a cylindrical bore and rotatably mounted on said bushing, lock means carried by the head for locking the head to the bushing and extending into said groove to prevent removal of the head from the bushing, a shaft carried by said head and including a threaded portion, and a key for rigidly securing a steering wheel thereto.

18. In combination with a steering rod, a circumferentially grooved bushing rigidly secured thereto, a steering head rotatably mounted thereon, a separate shaft carried by said head to receive a steering wheel, and means extending into the bushing to lock the head to the bushing.

19. In combination with a steering rod, means for removably securing a bushing rigidly thereto, a steering head rotatably encompassing said securing means and bushing, a wheel carrier movably mounted on the head, an instrumentality to lock said carrier to the head and said head to the bushing to prevent removal of said carrier and head from the bushing and rod, and a steering wheel mounted on the carrier.

20. In combination with a steering rod, a steering head mounted thereon, means for removably securing a separate shaft rigid to said head, and means for adjustably securing a steering wheel rigidly to said shaft.

21. In combination, a steering rod, a steering wheel, a carrier therefor, a shaft adjustable in the carrier and on which the wheel is mounted, said shaft having a threaded portion, a nut on the threaded portion to position the wheel relative to the shaft, and means for locking the carrier to the steering rod.

22. In combination with a steering rod, a steering wheel head rotatably mounted on said rod and removable therefrom, a wheel carrier movably mounted on the head and removable from said head, means to lock said carrier to the head and said head to the rod and prevent removal of said carrier and head from the rod, and a steering wheel mounted on the carrier.

23. In combination with a steering rod, a removable bushing rigidly secured thereto, a steering head rotatably mounted on said bushing, a steering wheel carrier pivotally mounted on said head, and means for securing a steering wheel to said carrier.

24. In combination with a steering rod, a steering head rotatably mounted on said rod, a steering wheel carrier movably mounted on said head, a separate shaft rigidly and detachably secured to said carrier, and a steering wheel mounted on said shaft.

25. In combination with a steering rod, a steering wheel head rotatably mounted on said rod and removable therefrom, a wheel carrier movably mounted on the head and removable from said head, means carried by the head to lock said carrier to the head and said head to the rod and prevent removal of said carrier and head from the rod, and a steering wheel secured to the carrier.

26. In combination, a steering rod, a steering wheel, a steering head mounted on said rod, a wheel carrier pivoted at one point to said head, means on the carrier to engage said head at another point, said means being adjustable to vary the distance between said head and carrier longitudinally in respect to the rod.

27. In combination with a steering rod, a circumferentially grooved bushing rigidly secured thereto, a steering head rotatably mounted on the bushing, means carried by the head for releasably locking the head to the bushing, said means extending into the groove in the bushing to prevent endwise removal of the head from the bushing, and means for securing a steering wheel to said head.

28. In combination with a steering rod, a bushing having a circumferential groove and rigidly secured to said rod, a steering head rotatably mounted on the bushing, a movable locking bolt carried by the head for releasably locking the head to the bushing, said locking bolt extending into the groove in the bushing to prevent endwise removal of the head from the bushing, and means for securing a steering wheel to said head.

EDWARD H. VINCENT.